UNITED STATES PATENT OFFICE.

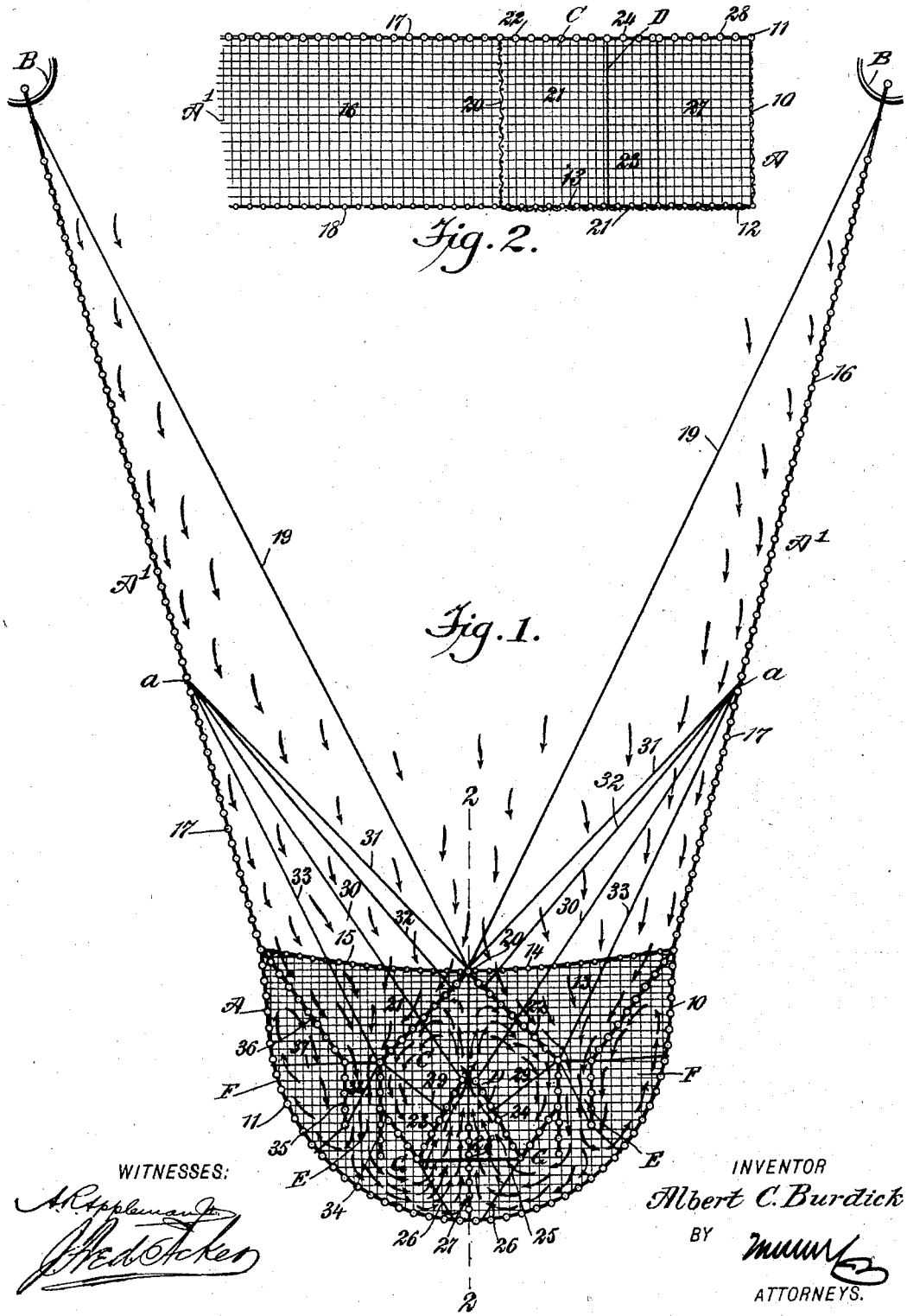

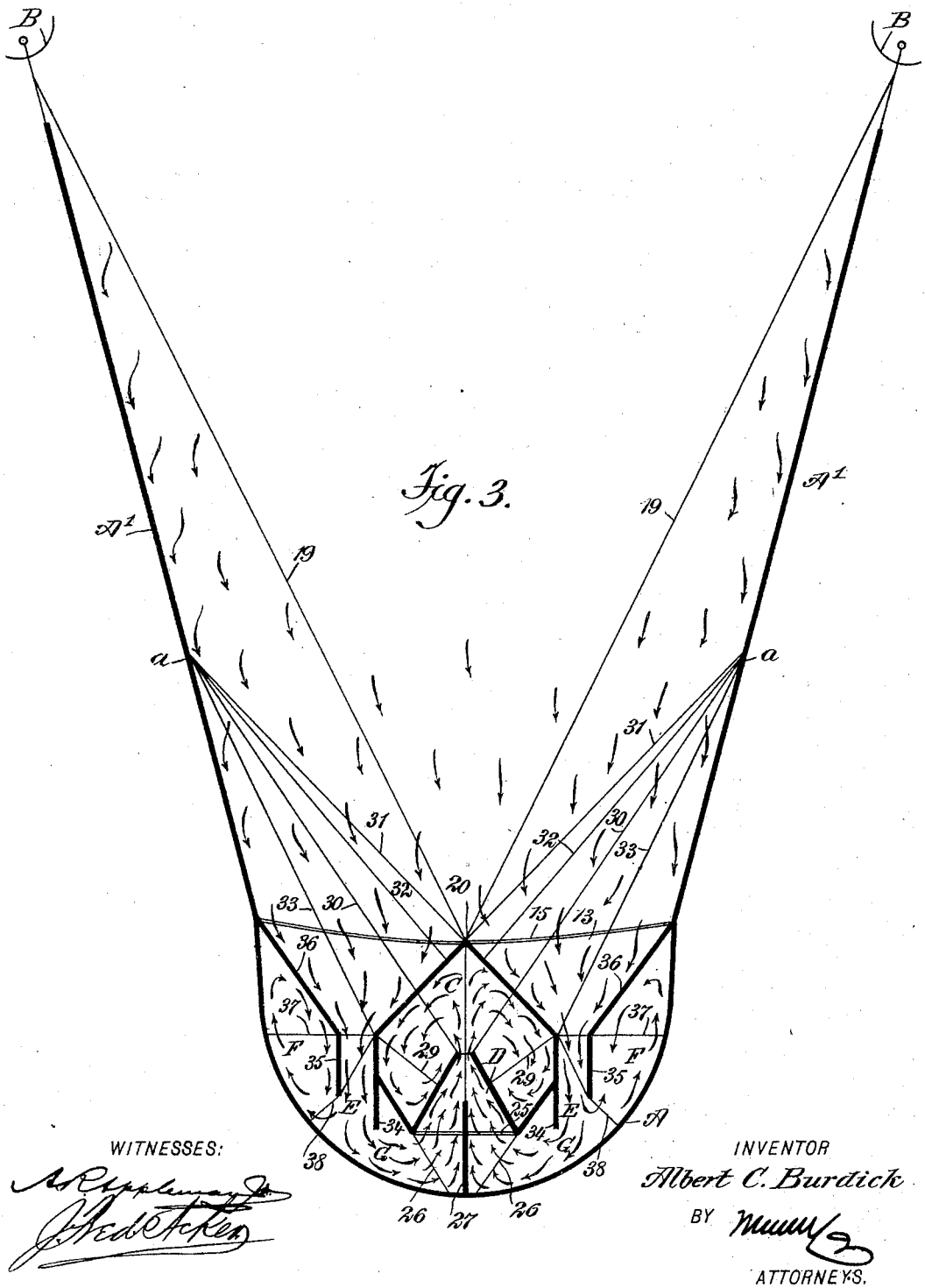

ALBERT CROMWELL BURDICK, OF SEATTLE, WASHINGTON.

FLOATING FISH-TRAP.

SPECIFICATION forming part of Letters Patent No. 719,738, dated February 3, 1903.

Application filed June 26, 1902. Serial No. 113,231. (No model.)

*To all whom it may concern:*

Be it known that I, ALBERT CROMWELL BURDICK, a citizen of the United States, and a resident of Seattle, in the county of King and State of Washington, have invented a new and Improved Floating Fish-Trap, of which the following is a full, clear, and exact description.

The purpose of this invention is to provide a pot-seine adapted to be used with or without scows and adapted to fish only with the tide and to be held by leads or guides, one at each side, which seine can be made of variable depths—from fifteen to seventy-five feet, for example—according to the species of fish sought to be caught, the leads or guides being of corresponding depth.

The especial purpose of the invention is to provide a seine with a central pot and pockets at each side of the pot, passages leading to the said pockets, and central pockets at the rear of the pot communicating with the side pockets and with a tunnel common to both of the rear pockets.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved fish-trap. Fig. 2 is a vertical section taken practically on the line 2 2 of Fig. 1, and Fig. 3 is a diagrammatic plan view of the trap.

The trap consists mainly of a seine A, leads or guides A', which extend from the forward ends of the seine in opposite directions for any desired distance, a central pot C, a tunnel D, leading into the pot, passages E, located over the seine, one at each side of the pot, side pockets F and rear pockets G, one in communication with each side pocket F and both in communication with the tunnel D.

The seine A consists of vertical netting and is segmental in formation, its rear being more or less concave. The netting 10, constituting the seine A, is provided at the top with floats 11 and at the bottom with weights 12 of desired size, and with a bottom 13, of netting, which connects with the side portions 10 of the seine.

At the forward portion 15 of the bottom 13 of the seine, or that portion which faces the tide, as the trap is intended to fish only with the tide, weights 14 of necessary size are secured, as is shown in Fig. 1. The leads or guides A' are made of netting of a depth corresponding to the depth of the netting 10 of the seine A, and the netting 16 of the guides or leads is provided at the top with suitable floats 17 and at the bottom with required weights 18. The said leads or guides A' are attached to floats B, suitably anchored, or may be attached to any moving object, if desired. Guy or brace ropes 19 extend from the forward end portions of the leads or guides A', at the inner faces thereof, to a central point at the front of the seine A, being connected with the upper portion of a vertical net-wall 20, which is at the central portion of the forward edge of the seine, being suitably attached to the bottom portion of said seine, and from the said wall 20 the central pot C extends. This pot is approximately diamond-shaped at the front on account of the tide and is partly diamond-shaped at the rear, having inclined forward and reversely-inclined rear walls, as is shown in Figs. 1 and 3. The pot C is made of netting 21, having suitable floats 22 at its upper edge, and the lower portion of the pot is attached to the bottom 13 of the seine in any suitable or approved manner. The rear end of the pot C is open, and from the side walls of the rear opening of the pot C the tunnel D extends forwardly to about the central portion of the pot. The said tunnel is more or less triangular in horizontal section and has an opening at its forward or contracted end through which the fish may find an escape into the pot C. The tunnel D is made of netting 23, which is vertically disposed and is attached to the bottom 13 of the seine, and the netting of the tunnel is provided at its upper edge with suitable floats 24. A cross-bar 25 normally holds the rear portion of the tunnel D open, the said cross-bar being at the top of said tunnel, or a stout rope may be employed for this purpose, if desired. The rear portions of the pot C and the tunnel D are held in proper position centrally with respect to the seine A by means of ropes 26, attached to the pot C, where the side walls of the tunnel D connect therewith, and to the rear wall of the seine A at each side of the central portion of the said wall, as is also shown in Figs. 1 and 3.

A vertical partition 27, formed likewise of netting, extends from the bottom 13 of the seine A upward as high as the upper portions of the tunnel D and the pot C, and this partition 27, which is centrally located with respect to the seine A, extends from the rear of the said seine centrally within the tunnel D to a predetermined point from the outlet of the said tunnel, as is also shown in Figs. 1 and 3. Brace-ropes 29 are attached to the sides of the tunnel D and to the sides of the pot C at a point in advance of their attachment to the tunnel, and the forward or outlet end of the tunnel D is braced and held in open position by two guide-ropes 30, extending in opposite directions or in direction of the leads A', to which leads the said ropes 30 are attached at a predetermined point $a$ in advance of the seine A. The forward end of the pot C and the forward vertical wall 20 of the seine forming a portion of the pot are held in vertical position by means of two guide-ropes 31, attached to the wall 20 and to the leads A' at the points $a$ above referred to, and the forward side walls of the pot C are held in position by guide-ropes 32 and 33, attached to the said walls at suitable points, and to the leads A' at the aforesaid points $a$, as shown in Figs. 1 and 3. Vertical partitions 34, also of netting, are secured to the bottom 13 of the seine at each side of the pot and these partitions are transverse partitions and form a portion of the sides of the pot and extend rearward to within a predetermined distance from the rear wall of the seine A. The net-partitions 34 are provided with suitable floats at their upper portions. Opposite each of the transverse partitions 34 a second transverse partition 35 is vertically located, attached to the bottom of the seine, being located between the side walls of the seine A and the partitions 34 just referred to, forming thereby the passage-ways E, and the partitions 35 stop short of the rear wall of the seine A. Each partition 35 is provided with a forward extension 36, and these extension-walls 36, also made of netting, are carried outward in opposite directions and connected with the seine A at the forward portion of its side walls, as is shown in Figs. 1 and 3, forming thereby the side pockets F, and the spaces between the rear wall of the pot C and the central partition 27, leading into the pot, form the rear pockets G, which are in communication with the side pockets F and are likewise in communication with the tunnel D, one at each side of the aforesaid central partition 27. It will be understood that the partitions 35 and their branches 36 are provided with floats at their upper portions, as is clearly shown in Fig. 1. The walls defining the passages E are held in proper position and kept practically in parallelism through the medium of brace-ropes 37, attached to their upper portions and to the side walls of the seine, and also through the medium of other brace-ropes 38, attached to the upper portion of the pot C at the rear end of its forward sections. These latter brace-ropes 38 extend diagonally across the passages E, being attached to the rear ends of the partitions 35, forming the outer walls of said passages, and to the rear portion of the seine A, as is also shown in Figs. 1 and 3.

It will be understood that a trap constructed as above set forth is adapted to fish only with the tide and that ordinarily it is permanently located by means of its leads at the desired spot, but that it may be used as a drag or it may be attached to floats, which floats in their turn may be suitably anchored.

In the drawings the arrows indicate the manner in which the fish are trapped. The fish follow the leads A' and swim into the seine, entering the passages E, from whence the fish pass directly into the rear pockets G, and from thence into the tunnel D, and from the tunnel into the pot C. The fish, however, passing through the passages E may enter the side pockets, in which event they follow the side walls of the seine and turn and follow the inner side walls of said side pockets. They then swim into the rear pockets and from thence through the tunnel to the pot.

Having thus described my invention, I claim as new and desire to secure by Letters Patent—

1. A floating fish-trap, consisting of a seine and leads extending therefrom, a central pot for the seine, pockets at each side of the pot, rear pockets communicating with the side pockets and in communication with the pot, and passages between the side pockets and the pot, as described.

2. A floating fish-trap, consisting of a seine, a central pot in the seine, leads extending from the forward side portions of the seine, a tunnel extending into the said pot from the rear, pockets formed in the seine at each side of the tunnel, rear pockets also formed in the seine at the rear portion of the pot, in communication with the side pockets and in communication with the tunnel, and passages open at the front, leading into the side and rear pockets, as and for the purpose set forth.

3. In a floating fish-trap, a segmental seine, consisting of side walls and a bottom, the seine at its open edge being adapted to face the tide, a pot centrally formed upon the said seine, open at its rear, a tunnel located within the pot at the open end thereof, a partition extending within the tunnel and attached to the rear of the seine, rear pockets, one at each side of the partition, in communication with the said tunnel, and side pockets also within the seine, in communication with the rear pockets, and partitions dividing the side pockets from the said pot, forming passages open at the front and open at the rear for the admission of fish through said passages to said pockets, and from said pockets through the channel into the pot, and leads extending from the forward outer portions of the seine, for the purposes set forth.

In testimony whereof I have signed my name to this specification in the presence of two subscribing witnesses.

ALBERT CROMWELL BURDICK.

Witnesses:
  K. H. HATFIELD,
  L. P. MANNING.